United States Patent
Bialach

(10) Patent No.: US 6,727,459 B1
(45) Date of Patent: Apr. 27, 2004

(54) METHOD FOR METAL DEPOSITION ON AN EDGE

(75) Inventor: Janusz Bialach, Ancaster (CA)

(73) Assignee: Liburdi Engineering Limited, Ontario (CA)

( * ) Notice: Subject to any disclaimer, the term of this patent is extended or adjusted under 35 U.S.C. 154(b) by 0 days.

(21) Appl. No.: 10/375,008

(22) Filed: Feb. 28, 2003

(51) Int. Cl.$^7$ .......................... B23K 26/14; B23K 26/34
(52) U.S. Cl. ................................. 219/121.64
(58) Field of Search ................ 219/121.63, 121.64, 219/121.65, 121.66, 121.84; 427/556, 596, 597

(56) References Cited

U.S. PATENT DOCUMENTS

| | | | |
|---|---|---|---|
| 4,418,266 A | | 11/1983 | Rosenbeck et al. |
| 5,532,454 A | | 7/1996 | Kuhnen ...................... 219/137 |
| 5,578,227 A | | 11/1996 | Rabinovich ............ 219/121.63 |
| 5,889,254 A | * | 3/1999 | Jones |
| 6,144,008 A | * | 11/2000 | Rabinovich |
| 6,326,585 B1 | | 12/2001 | Aleshin et al. ........ 219/121.63 |
| 6,441,338 B1 | * | 8/2002 | Rabinovich |
| 6,476,343 B2 | | 11/2002 | Keicher et al. ........ 219/121.63 |

FOREIGN PATENT DOCUMENTS

| | | |
|---|---|---|
| DE | 198 02 305 A1 | 8/1998 |

OTHER PUBLICATIONS

"Production of 3–D Structures with High Strength–to–Weight Ratios", H&R Technology, http://www.hrtechnology.com/new_page_4.htm (1 page).

Rabinovich, "The Paradigm Shifts: Net–Shape Manufacturing", http://www.ndx.com/pringpage.asp?article_id=373 (3 pages).

Gedda, "Laser Surface Cladding: A Literature Survey", Lulea University of Technology, Technical Report / 2000:07, Mar. 22, 2000, http://epubl.luth.se/1402–1536/2000/07/index–en.html (2 pages).

* cited by examiner

Primary Examiner—Samuel M. Heinrich
(74) Attorney, Agent, or Firm—Smith, Gambrell & Russell, LLP

(57) ABSTRACT

A method of depositing metal onto an edge of a metallic substrate, preferably a metallic, thin-edge substrate, involves: (1) directing a high intensity light beam onto the substrate, thereby melting a portion of the substrate and forming a weld pool; (2) while directing the light beam onto the weld pool, introducing a filler wire into the weld pool, wherein exposure to the light beam and residual heat in the weld pool causes the filler wire to melt into the weld pool, the light beam providing sufficient energy to fuse the molten filler wire to the substrate; (3) feeding the filler wire into the weld pool while effecting relative motion between the filler wire and the light source relative to the substrate such that a continuous weld bead is formed from the weld pool; and (4) during steps (1)–(3), exposing the weld pool and filler wire disposed therein to a shielding gas so as to protect the weld pool and filler wire from oxidation. Preferably, the method further involves, after step (3), adjusting filler wire feed rate, light source output, weld velocity and relative movement between the substrate and the light source during deposition to compensate for variations in substrate thickness. A high aspect ratio metal deposit can be achieved by depositing several beads of metal on top of each other.

15 Claims, 6 Drawing Sheets

METHOD FOR METAL DEPOSITION ON AN EDGE

BACKGROUND OF THE INVENTION

The present invention relates to a method and apparatus for metal deposition. More particularly, the present invention relates to a method and apparatus for depositing metal onto the edge of a thin metal substrate.

Current techniques for depositing metal onto thin edge substrates include arc processes using filler wire and laser processes using metal powder. Such techniques are frequently used to repair components found in modern gas turbine engines. These components are subjected to extreme conditions which can cause mechanical and thermal damage, usually in the form of cracking or abrasion wear, which often occurs in specific regions. Due to the extreme operating conditions, these components are highly complex and expensive to manufacture. The replacement costs for these parts are extremely high and, in most cases, repair is a more viable solution.

The repair process typically involves: excavating the damaged region using a machining or a grinding process, replacing the excavated material (typically by melting a suitable filler metal and fusing it to the part being repaired), and then shaping the deposited metal to resemble the geometry of the original part. Replacement of the excavated material is conventionally performed using either the arc-and-wire process (e.g., gas tungsten arc welding (GTAW) or plasma arc welding (PAW)) or laser-and-powder process mentioned above. Although these methods are suitable for material deposition, both have certain limitations.

For example, GTAW and PAW processes induce substantial heat into the part being repaired, which can adversely affect the metallurgy. To eliminate this problem, complex chills are used to cool the parent material. In addition, the weld bead profile is relatively difficult to control, resulting in a substantial amount of material that needs to be removed during the final shaping process. An example of an arc-and-wire process is disclosed, e.g., in U.S. Pat. No. 4,418,266, which is hereby incorporated by reference herein its entirety.

The laser-and-powder process (which uses a laser in combination with metal powder used as a filler) has a lower heat input and can produce "near-net" geometry. Examples of a laser-and-powder process are disclosed, e.g., in U.S. Pat. Nos. 6,326,585 and 6,476,343, which are both hereby incorporated by reference herein in their entirety. However, the metallurgical properties of the resulting deposit are often inferior to those generated by an arc process. For example, the level of porosity is often too high to meet specifications. In addition, some of the powder misses the weld pool, commonly referred to as "overspray", resulting in wasted material and potential damage to the substrate.

Over the years, material joining and cladding operations have been conducted using a third technique, referred to as a "laser-and-wire process". Example of laser-and-wire processes are disclosed, e.g., in U.S. Pat. No. 5,578,227 (which uses flat wire) and in on-line articles: "Production of 3-D Structures with High Strength-to-Weight Ratios" (found at the website http://wvww.hrtechnology.com/new page 4.htm) and "The Paradigm Shifts: Net-Shape Manufacturing" (found at the website http://www.ndx.com/printpage.asp?article id=373). The foregoing references are hereby incorporated by reference herein in their entirety.

In material joining processes, wire is commonly used to fill the space between two or more elements being welded together or as an alloying element. An example of a material joining process is disclosed, e.g., in U.S. Pat. No. 5,532,454, which is hereby incorporated by reference herein in its entirety.

In cladding processes, a filler wire is melted to create a relatively thin, homogenous layer of metal. An example of a cladding process is disclosed, e.g., in U.S. Pat. No. 5,889,254, which is hereby incorporated by reference herein in its entirety.

The layer formed by a cladding or material joining process can be used to replace worn-out material in repair applications or to create a coating with specific properties such as corrosion or wear resistance.

Metal deposition onto a thin edge of a metal substrate differs substantially from cladding applications. In thin-edge applications, the object is to generate a "high" deposit (i.e. a deposit having a high height-to-width ratio, also referred to as a high aspect ratio), rather than a flat layer. This presents several difficulties which are not present in cladding. For example, a thin edge does not provide a good heat sink for the weld pool. As a result, the weld pool temperature and, consequently, the weld pool size must be minimized in order to prevent excessive melting of the substrate. However, decreasing the temperature and size of the weld pool narrows down the parameter range in which a successful deposition can be achieved. Of particular importance is the relation between the heat sink properties of the substrate, the power input rate and the wire feed rate. Surprisingly, the relationship between the distance from the wire nozzle to the weld pool and the wire diameter is also critical. This relationship has been overlooked in the past, resulting in wire entry control problems.

Thus, it is continually desirable to provide a method and apparatus for depositing metal onto a thin edge of a metal substrate, which provide a deposit having a high aspect ratio, a "near-net" geometry and good metallurgical properties, which is achieved without excessive waste of material or the use of chills.

SUMMARY OF THE INVENTION

The present invention provides a method and apparatus for depositing a metallic material onto a thin edge of a metal substrate (also referred to herein as a "thin-edge metal substrate"), wherein the invention eliminates the problems associated with the laser-and-powder and arc-and-wire processes described above. Instead of using an arc-and-wire process or a laser-and-powder process, the instant invention uses a "laser-and-wire" process to deposit metal onto a thin-edge substrate. As noted above, laser-and-wire processes have been used in material joining and cladding operations. However, as was further pointed out above, material joining and cladding operations differ significantly from thin-edge deposition operations, the latter operations involving challenges not encountered in the former operations.

The present invention overcomes the problems associated with the arc-and-wire and laser-and-powder processes. As noted above, both of these techniques suffer from problems that are difficult to overcome. The arc-and-wire process induces substantial heat into the substrate which creates a requirement for cooling. The deposits produced using the laser-and-powder process often suffer from inferior metallurgical quality. This process also creates problems with metal deposition inefficiencies and "overspray".

The present invention is based on the discovery that the laser-and-filler process of this invention can effectively deposit metal onto a thin-edge metal substrate without the problems associated with the arc-and-wire and laser-and-powder processes.

The present invention is directed to a method of depositing metal onto an edge of a metallic substrate, involving (1) directing a high intensity light beam onto the substrate, thereby melting a portion of the substrate and forming a weld pool;

(2) while directing the light beam onto the weld pool, introducing a filler wire into the weld pool, wherein exposure to the light beam and residual heat in the weld pool causes the filler wire to melt into the weld pool, the light beam providing sufficient energy to fuse the molten filler wire to the substrate;

(3) feeding the filler wire into the weld pool while effecting relative motion between the filler wire and the light source relative to the substrate such that a continuous weld bead is formed from the weld pool;

(4) optionally adjusting tiller wire feed rate, light source output, weld velocity and relative movement between the substrate and the light source during deposition to compensate for variations in substrate thickness; and (5) during steps (1)–(4), exposing the weld pool and filler wire disposed therein to a shielding gas so as to protect the weld pool and filler wire from oxidation.

The method of this invention is preferably carried out by a metal deposition apparatus composed of:

(a) a high intensity light source for melting a portion of the substrate to form a weld pool;

(b) a filler delivery system for continuously delivering a filler wire to the weld pool;

(c) a motion system for effecting relative motion between the substrate and the light source;

(d) a shielding gas delivery system for delivering a shielding gas to a position such that the shielding gas protects the weld pool and filler wire disposed in the weld from oxidation; and (e) means for adjusting process and motion parameters to compensate for variations in substrate thickness.

The metal deposit achieved by the present invention is characterized by a relatively high height-to-width ratio (also referred to as "aspect ratio"). The aspect ratio can be further enhanced by depositing several beads of metal on top of each other.

The weld bead profile and metallurgical properties can be controlled by varying process parameters such as speed, power input and wire feed rate.

The method and apparatus of the present invention can be used in any application which requires metal deposition, particularly applications wherein specific properties and geometries of the deposited metal are required. When used to repair components found in modern gas turbine engines, the present invention avoids the problems associated with conventional repair techniques, discussed above, and achieves "near-net" geometry and good metallurgical quality without the use of chills or excessive waste of material.

DETAILED DESCRIPTION OF THE INVENTION

Figure 1A:
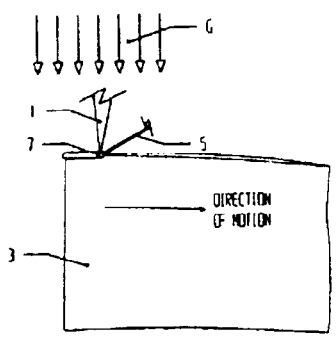
FIG. 1A illustrates the basic components used in the method of this invention.

As noted above, the present invention provides a method and apparatus for depositing metal onto an edge of a metallic substrate, preferably a thin-edge metal substrate.

As used herein, the term "thin-edge" refers to an edge having a section thickness that can be fully covered by a single weld bead. Typically, the section thickness of the edge ranges from about 0.010 inch to about 0.200. However, the present invention is not limited to this thickness range.

The apparatus of this invention includes a high intensity light source (e.g., a laser), a means of providing relative motion between the light source and the substrate on which deposition is to occur, a wire delivery means for delivering a metal filler wire into the weld pool formed when the substrate is melted by exposure to the light source, and a means of shielding the weld pool from the atmosphere so as to prevent oxidation of the pool.

The method of this invention involves exposing the substrate to the high intensity light source to melt the substrate and form the weld pool. The metal filler wire is then introduced into the weld pool. Residual heat in the weld pool and exposure to the light source cause the wire to melt into the pool. The light source provides sufficient energy to fuse the molten filler wire to the substrate. Preferably, the filler wire is fed into the weld pool while the wire and the light source are moved relative to the substrate. As the light source is moved away, the weld pool and molten wire inserted therein cools and a metallurgical bond is formed between the substrate and the filler metal. Process and motion parameters, i.e., filler wire feed rate, light source output, weld velocity and relative movement between the substrate and the light source can be continually adjusted during deposition to compensate for variations in substrate thickness. The weld pool is protected against oxidation by a shielding gas provided by the shielding means.

In a particularly preferred embodiment of the method of this invention, the light source and the filler wire are aligned in step (3) such that the angle formed between the longitudinal axis of the filler wire and the longitudinal axis of the light source will range from about 10 degrees to about 130 degrees, more preferably about 60 degrees.

The invention will now be described with reference to FIGS. 1–7 herein.

The apparatus of this invention includes a high intensity light source 1, a motion system 2 for moving a metal substrates and light source 1 relative to one another (see FIG. 5), a filler wire delivery system 4 for moving a metal filler wire 5 to the substrate and introducing a portion of the wire into a weld pool formed when the substrate is exposed to a light beam emitted by the light source, and a shielding gas delivery system 6 for delivering a shielding gas G to a position where the gas shields the substrate and filler wire from oxidation. In addition, the apparatus includes means for adjusting process and motion parameters to compensate for variations in substrate thickness.

In the method of the invention as illustrated in the attached Figures. light source 1 is used to provide sufficient energy to melt a portion of metal substrate 3 to generate a weld pool 7. To control the size and shape of the focus spot, light source 1 may use optical components such as lenses or mirrors (not shown). The focal spot size is preferably equal to or greater than the filler wire diameter.

The heat input range provided by the light source in this invention is preferably from 10 to 3000 watts.

Light source 1 can be a continuous wave or pulsed industrial laser, such as Nd:YAG, $CO_2$, diode, or any other high intensity light source. Suitable light sources and associated optical parts are disclosed, e.g., in U.S. Pat. Nos. 5,578,227 and 5,889,254, both of which have been previously incorporated by reference herein in its entirety.

In preferred embodiments of the present invention, the light source is a continuous wave Nd:YAG laser.

In the embodiment shown in the attached Figures, substrate 3 is a compressor blade tip. Other examples of suitable substrates include but are not limited to airfoil tips, airfoil edges, shroud edges, platform edges, angel wing seals, and knife edge seals.

Conventional means of supplying filler wire, such as a roller drive unit and a wire spool, can be used as the filler wire delivery system 4. The filler wire delivery system can supply the wire in a continuous or pulsed mode to enhance the bead geometry. Examples of suitable filler wire delivery systems are disclosed, e., in U.S. Pat. No. 5,578,227, which was previously incorporated by reference herein.

Filler wire 5 preferably has a round cross section and the diameter should be selected based on the light source focal spot size and desired deposition rates. Preferably, the filler wire diameter will range from 0.005 to 0.100 inch.

Suitable metals for use as the filler wire and as the substrate include but are not limited to titanium and its alloys, nickel and its alloys, cobalt and its alloys, iron and its alloys. The preferred metal for use as the filler wire and as the substrate is titanium or a titanium alloy.

The filler wire delivery system 4 includes a wire nozzle 8. Light source 1 and wire nozzle 8 (see FIG. 2) are mechanically coupled and aligned such that a portion 5a of metal filler wire 5 carried by nozzle 8 is introduced into weld pool 7. Energy from light source 1 and residual heat in the weld pool causes wire 5a to melt and fuse into the weld pool.

After the wire portion 5a is melted into the weld pool, the light source and the substrate are moved apart so that the weld pool and molten wire disposed therein are able to cool. A metallurgical bond is then formed between the substrate and the filler metal in the wire.

In the method of this invention, a continuous wire feed and relative motion between light source 1 and substrate 3 occur at the same time. Specifically, the filler wire 5 is continuously fed into the weld pool while the wire and the light source are moved relative to the substrate. This results in the formation of a continuous metal bead 9 (see FIG. 1B)

Preferably, the filler wire is fed into the weld pool at a rate of from 1 to 300 inches per minute. The weld velocity preferably ranges from 1 to 100 inches per minute.

The relative motion between light source 1 and substrate 3 can be achieved by either moving the substrate or by moving the light source and wire delivery system. A conventional XYZ Cartesian motion platform 10 is sufficient for most applications. An additional degree of freedom in the form of a rotary axis 15 may be required to adjust wire feed orientation with respect to the direction of motion. An example of a suitable motion system is disclosed, e.g., in U.S. Pat. No. 5,578,227, which has previously been incorporated by reference herein.

In general, the substrate 3 is placed on the platform 10 which moves in X, Y and Z axes. The X- and Y-axis movements produces the shape of the deposit, while the Z axis moves upwardly to form subsequent metal beads on top of one another.

Figure 5:
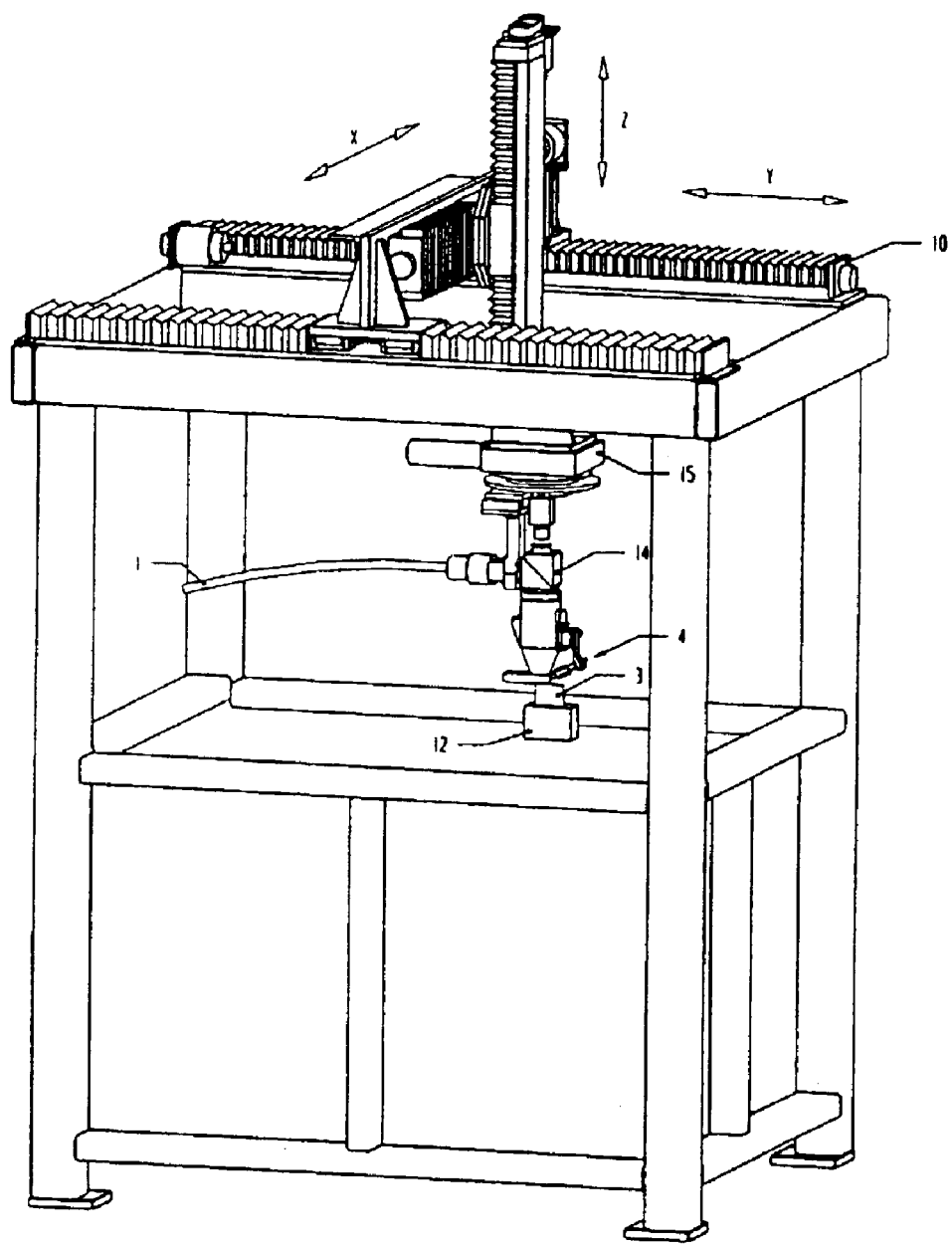
FIG. 5 is a schematic illustration of major system modules used in the method of this invention.

FIG. 5 illustrates the relative motion of the light source relative to the substrate. In the embodiment shown in FIG. 5, the substrate is stationary and a laser focusing head 11 moves in XYZ directions. A laser fiber is attached to the focusing head and connects it to the laser source. A fixture 12 holding the substrate is attached to the same frame as the motion axes which move the focusing head.

The weld pool and wire portion disposed therein are protected from oxidation by introduction of a shielding gas G. The shielding can be either introduced locally by directing it over the weld pool or by submerging the repair area in the protective gas. For metals highly susceptible to oxidation, such as titanium alloys, a secondary oxidation protection may be required. This is accomplished by introducing a trailing gas (not shown) by means of a trail cup 13. Both shielding and trailing gases should be inert. e.g., argon or helium, and may contain some reducing elements such as, e.g., hydrogen.

Suitable shielding gases and shielding gas delivery systems are disclosed, e.g., in U.S. Pat. No. 5,889,254, which has been previously incorporated by reference herein.

The bead geometry and metallurgical properties for a given filler wire, focal spot geometry, and substrate combination can be varied by controlling the following parameters: filler wire feed rate, weld velocity, and heat input rate (laser power). These parameters can be varied during the deposition process. Thus, a near net shape deposit with relatively uniform height can be achieved even on variable width substrates.

Figure 1B:
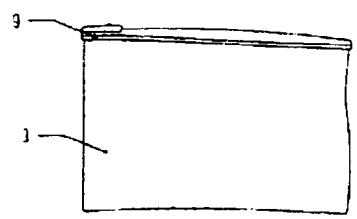
FIG. 1B illustrates two fully deposited weld beads and one partly deposited weld bead on the top edge of a compressor blade airfoil.

The metal deposit formed by the method of this invention will have a relatively high aspect ratio. For example, a first weld bead (i.e., a bead formed after a single pass) can have an aspect ratio of as high as 1:1. The aspect ratio of the build-up can be further increased by depositing weld beads on top of each other as shown in FIG. 1B, i.e., by repeating steps (1)–(4) of the method one or more times. Thus, a first weld bead formed on the thin edge substrate can function itself as a thin edge substrate for a subsequently deposited second weld bead, and the second weld bead can serve as a thin edge substrate for a third weld bead, and so on.

In the method of this invention, a metal bead with relatively uniform height can be deposited on a variable width surface (e.g., the tip of a compressor blade airfoil) by adjusting process parameters during the deposition. The parameters can be adjusted using process control software (see FIG. 4) based on geometric information received from a vision system. An example of a suitable computer system for controlling process parameters is an automated welding system commercially available from Liburdi Automation Incorporated under the designation LAWS-1000™.

Figure 2:
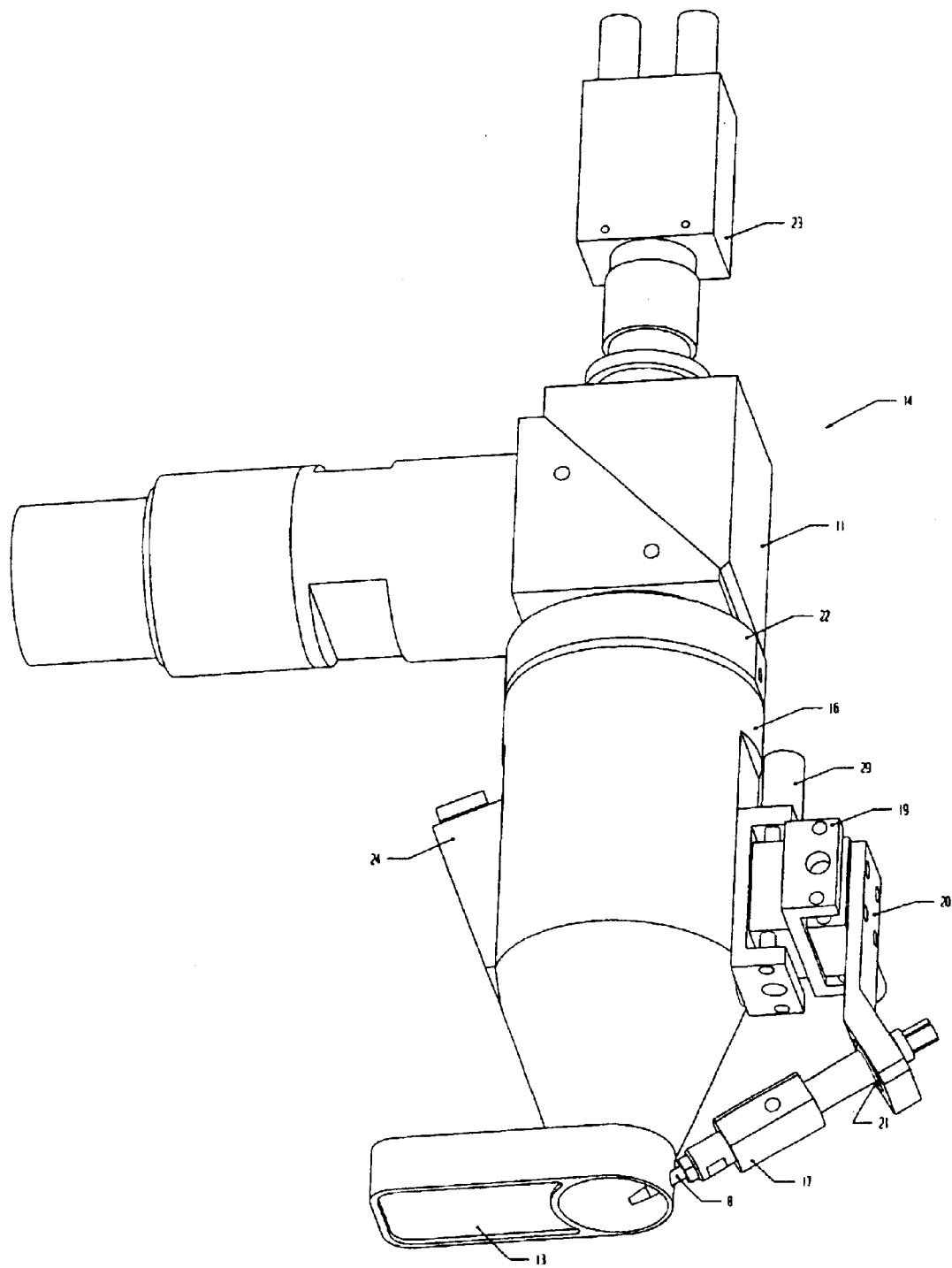
FIG. 2 shows components of a metal deposition apparatus which can be used in the method of this invention.

FIG. 2 illustrates a preferred embodiment of a metal deposition apparatus 14 within the scope of this invention.

In apparatus 14, high density light source 1 enters focusing head 11 which houses beam conditioning optics (not shown). The optics focus the light beam just below a shield cup 16. Filler wire 5 is introduced into weld pool 7 via wire nozzle 8. Nozzle 8 is cooled by circulating water within a water jacket 17.

Figure 3:
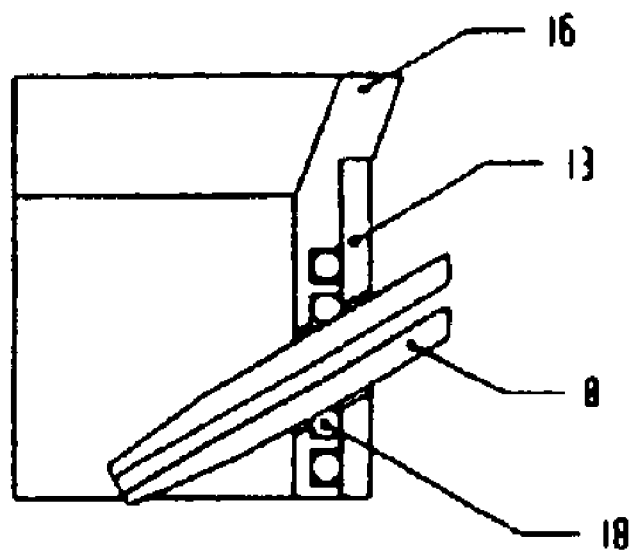
FIG. 3 shows a sectional view of the area of the apparatus of FIG. 2 wherein the wire nozzle penetrates the shield cup.
Figure 4:
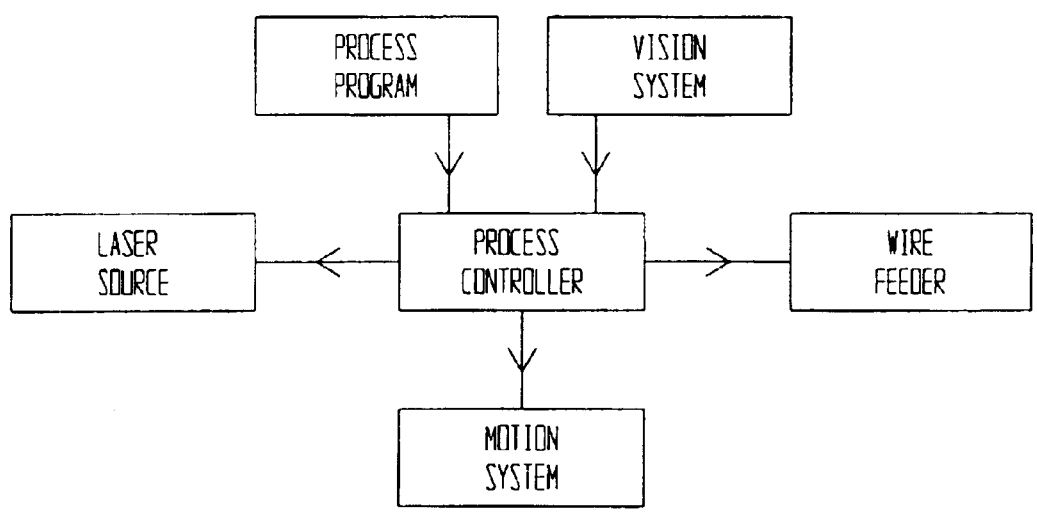
FIG. 4 illustrates an embodiment of a motion system used in the method of the present invention, wherein the motion system includes means for moving the light source relative to the substrate.

Wire nozzle 8 penetrates shield cup 16 as shown in FIG. 3. Access is sealed by means of an O-ring 18 located between shield cup 16 and trail cup 13. O-ring 18 also acts as a pivot point for a wire nozzle positioning mechanism 19. Mechanism 19 is composed of two slides 29 which facilitate transverse and vertical wire nozzle adjustment. The slides are connected to wire nozzle 8 via a bracket 20 and a ball joint bearing 21. O-ring 18 and ball joint bearing 21 also facilitate sliding motion for wire nozzle 8, which allows for distance control between nozzle 8 and weld pool 7.

Shielding gas G is introduced into a gas distribution ring 22 attached to focusing head 11. Ring 22 assures even distribution of gas flow with shield cup 16 which attaches to distribution ring 22 and directs the gas flow towards weld pool 7.

Secondary gas protection, i.e., trail gas, (step (5)) can be introduced over the cooling portion of the metal deposit by means of trail cup 13.

Apparatus 14 can also be equipped with an auxiliary camera 23, which enables direct viewing of the repair area. An auxiliary light source 24 may be required to illuminate the repair area for viewing.

Most turbine components that undergo repair have small geometrical differences. These differences can affect the quality of the metal deposit. It is desirable to characterize these differences by using a CCD camera to obtain an image of the repair area. This image is then analyzed by the process control software. This type of vision system is often used in laser and powder or arc process repairs to determine the motion path. However, the information obtained by the system can also be used to automatically adjust the process parameters listed above. This makes the process more robust and minimizes the need for operator intervention.

The properties of the deposited weld metal (such as hardness, strength and wear resistance) can be controlled by proper selection of the filler wire and will also be affected by cooling rates of the molten metal and alloying elements in the substrate.

The method and apparatus of the present invention are particularly useful in the repair of components found in modern gas turbine engines. The present invention eliminates the problems associated with conventional repair techniques and achieves "near-net" geometry and good metallurgical quality without the use of chills or waste of material.

The present invention can also be used in other industries where metal deposition is required. For example, it can be used to repair worn edges on moulds and machining tools. It can also be used in new-part manufacturing or in any application where deposition of metal with specific properties and geometries is required.

Experimental Example

Figure 6:
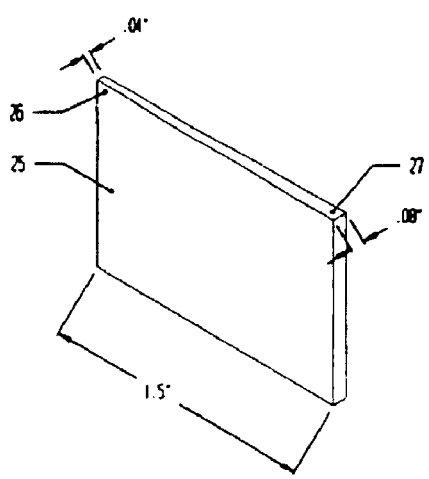
FIG. 6 represents a thin edge of a substrate section of variable edge thickness, on which metal deposition in accordance with the method of this invention can be conducted.

FIG. 6 represents a substrate section 25 on which metal deposition was carried in this Example. As can be seen in FIG. 6, substrate section 25 had a variable edge thickness, wherein the thickness varied from about 0.04 inch to about 0.08 inch over a length of about 1.5 inches. In this Example, the metal filler wire and the substrate section were both composed of 6A14V titanium alloy, and the wire had a round cross-section with a diameter of 0.025 inch. Localized shielding, using argon as the shielding gas, was implemented to prevent oxidation of the weld pool. No external chills were used to cool the weld pool.

The motion and process parameters used in the deposition process were controlled by means of the LAWS-1000™ Automated Welding System commercially available from Liburdi Automation Incorporated.

The light source was a continuous wave Nd:YAG laser with a 0.025 inch focal spot size.

The direction of metal deposition was from the thinner end 26 to the thicker end 27 of substrate section 25. Constant weld velocity of 7 inches per minute was maintained during the deposition process. Both the filler wire feed rate and the laser output power were continually varied during the deposition to compensate for the varying thickness. These two parameters were sloped at constant rate such that at Point A the wire feed rate and laser output power were 25 inches per minute and 200 watts, respectively, and at Point B, the wire feed rate was 50 inches per minute and the laser output power was 430 watts (FIG. 7).

Figure 7:
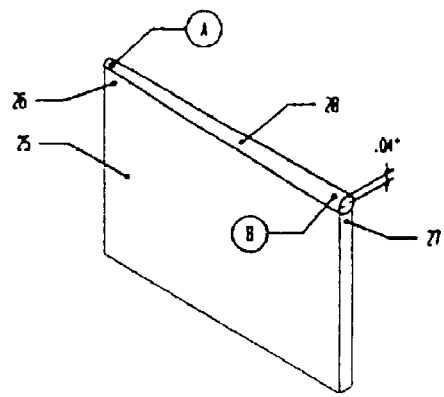
FIG. 7 shows a weld bead deposited on the substrate of FIG. 6.

FIG. 7 illustrates a metal bead 28 formed by the foregoing process. The bead 28 formed after a single pass (which extends from Point A to Point B) had a build-up height of 0.04 inch over the whole length of the substrate section.

While the invention has been described with reference to specific embodiments, modifications and variations of the invention may be constructed without departing from the scope of the invention, which is defined in the following claims.

What is claimed is:

1. A method of depositing metal onto a thin-edge metallic substrate, comprising:
   (1) directing a high intensity light beam onto the substrate, thereby melting a portion of the edge and forming a weld pool;
   (2) while directing the light beam onto the weld pool, introducing a filler wire into the weld pool, wherein exposure to the light beam and residual heat in the weld pool causes the filler wire to melt into the weld pool, the light beam providing sufficient energy to fuse the molten filler wire to the substrate;
   (3) feeding the filler wire into the weld pool while effecting relative motion between the filler wire and the light source relative to the substrate such that a continuous weld bead is formed from the weld pool; and
   (4) during steps (1)–(3), exposing the weld pool and filler wire disposed therein to a shielding gas so as to protect the weld pool and filler wire from oxidation.

2. A method according to claim 1, further comprising, after step (3), the step (5) of adjusting filler wire feed rate, light source output, weld velocity and relative movement between the substrate and the light source during deposition to compensate for variations in substrate thickness.

3. A method according to claim 1, wherein, in step (3), the filler wire and the light source are aligned so that the longitudinal axis of the filler and the longitudinal axis of the light source form an angle of from about 10 degrees to about 130 degrees.

4. A method according to claim 3, wherein the angle is about 60 degrees.

5. A method according to claim 1, wherein, in step (3), the filler wire is fed in a pulsed manner into the weld pool.

6. A method according to claim 1, wherein the substrate has a thickness of from 0.010 inch to about 0.200 inch.

7. A method according to claim 1, wherein the filler wire has a round cross-section.

8. A method according to claim 7, wherein the filler wire has a diameter of from 0.005 inch to 0.100 inch.

9. A method according to claim 1, wherein the substrate comprises a metal selected from the group consisting of titanium, titanium alloys, nickel, nickel alloys, cobalt, cobalt alloys, iron and iron alloys.

10. A method according to claim 1, wherein the filler wire comprises a metal selected from the group consisting of titanium, titanium alloys, nickel, nickel alloys, cobalt, cobalt alloys, iron and iron alloys.

11. A method according to claim 1, wherein the substrate is selected from the group consisting of airfoil tips, airfoil edges, shroud edges, platform edges, angel wing seals and knife edge seals.

12. A method according to claim 1, further comprising, during steps (1)–(4), exposing the weld pool and filler wire disposed therein to a trailing gas to provide additional protection from oxidation.

13. A method according to claim 1, comprising repeating steps (1)–(4) one or more times to form weld beads deposited on top of one another to form a continuous bead structure.

14. A method according to claim 1, wherein the method forms on said thin-edge metallic substrate a first weld bead having an aspect ratio of 1:1.

15. A method according to claim 14, wherein the method further comprises using the first weld bead as a substrate for a subsequently deposited second weld bead.

* * * * *